United States Patent [19]

Bricot et al.

[11]  4,275,275
[45]  Jun. 23, 1981

[54] RECORDING DEVICE FOR OPTICALLY RECORDING INFORMATION ON A CARRIER WITH A LIGHT SPOT AND A POSITIONAL CONTROL OF THE SPOT

[75] Inventors: Claude Bricot; Jean Claude Lehureau, both of Paris, France

[73] Assignee: Thomson-Brandt, Paris, France

[21] Appl. No.: 1,006

[22] Filed: Jan. 4, 1979

Related U.S. Application Data

[63] Continuation of Ser. No. 837,383, Sep. 27, 1977, abandoned.

[30] Foreign Application Priority Data

Oct. 1, 1976 [FR] France ............................... 76 29609

[51] Int. Cl.³ ............................................... G11B 7/00
[52] U.S. Cl. ................................... 369/44; 346/76 L; 369/109; 369/111
[58] Field of Search .................. 358/128, 128.5, 128.6; 365/215, 216, 234; 179/100.3 V, 100.3 D, 100.3 G, 100.3 B, 100.1 G; 346/76 L, 108

[56]  References Cited

U.S. PATENT DOCUMENTS

| | | | |
|---|---|---|---|
| 3,438,050 | 4/1969 | Aschenbrenner et al. | 365/234 X |
| 3,657,707 | 4/1972 | McFarland et al. | 346/76 L |
| 3,924,062 | 12/1975 | Broadbent | 179/100.3 V |
| 4,074,085 | 2/1978 | Russell | 179/100.3 D |
| 4,085,423 | 4/1978 | Tsunoda et al. | 358/128 |
| 4,094,010 | 6/1978 | Pepperl et al. | 365/215 |
| 4,094,013 | 6/1978 | Hill et al. | 365/234 |
| 4,138,741 | 2/1979 | Hedlund et al. | 365/234 |
| 4,167,024 | 9/1979 | Hamisch | 179/100.1 G |

FOREIGN PATENT DOCUMENTS 436391  12/1974  U.S.S.R. .................................. 365/234

OTHER PUBLICATIONS

Broadbent, "A Review of the MCA Disco-Vision System", Journal of the SMPTE, Jul. 1974, vol. 83, pp. 554-559.

Primary Examiner—Bernard Konick
Assistant Examiner—Donald McElheny, Jr.
Attorney, Agent, or Firm—Cushman, Darby & Cushman

[57]  ABSTRACT

The invention relates to devices for optically recording information on a rotating carrier with a recording spot along a track. In accordance with the present invention, there is provided a reading spot kept at a constant distance, equal to an integral multiple of the pitch of the track, from said recording spot. The reading spot is made to follow an already recorded track element by means of a feedback loop. The simultaneous displacement of the two spots is controlled by a signal obtained by the detection of the reading beam.

13 Claims, 8 Drawing Figures

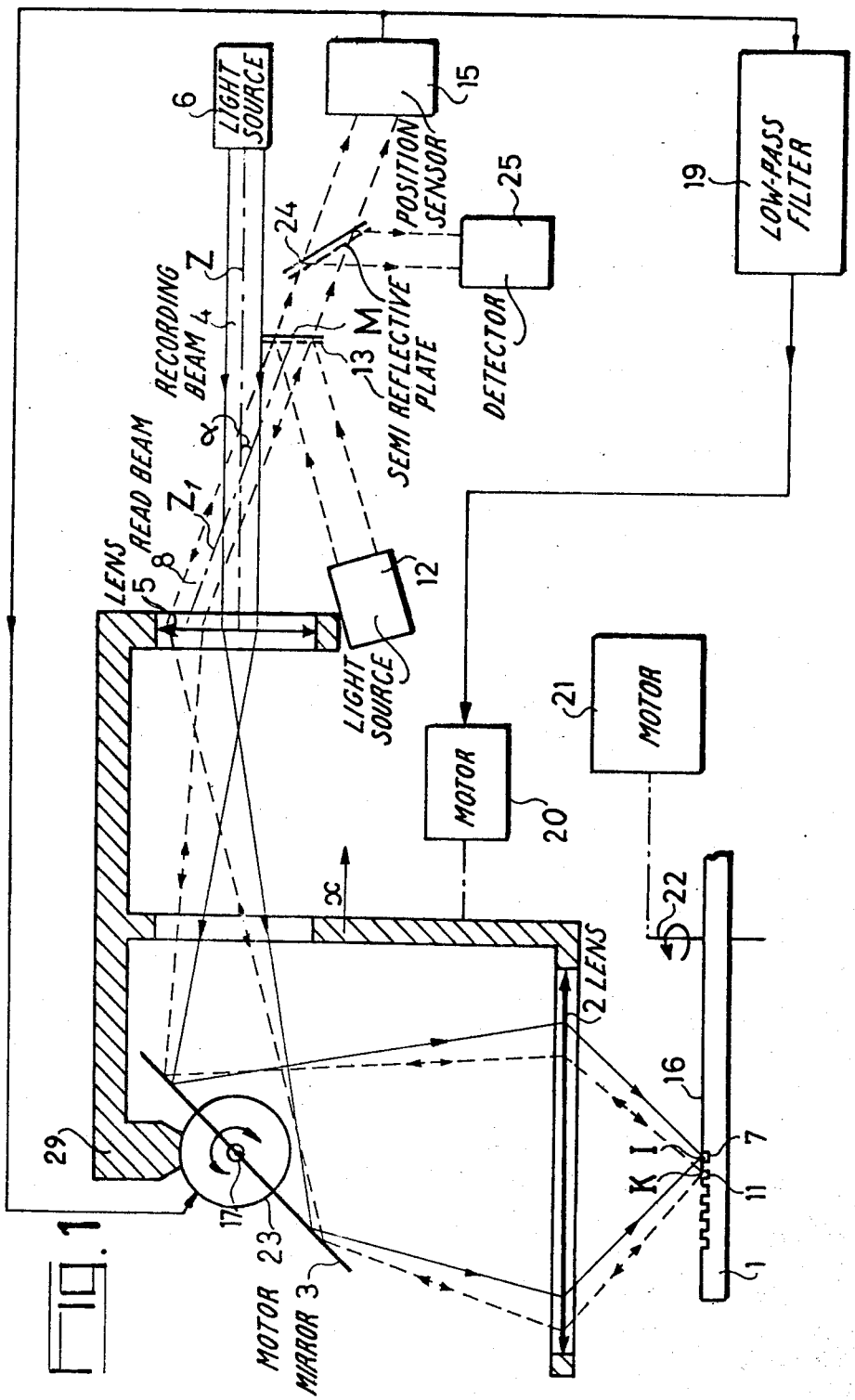

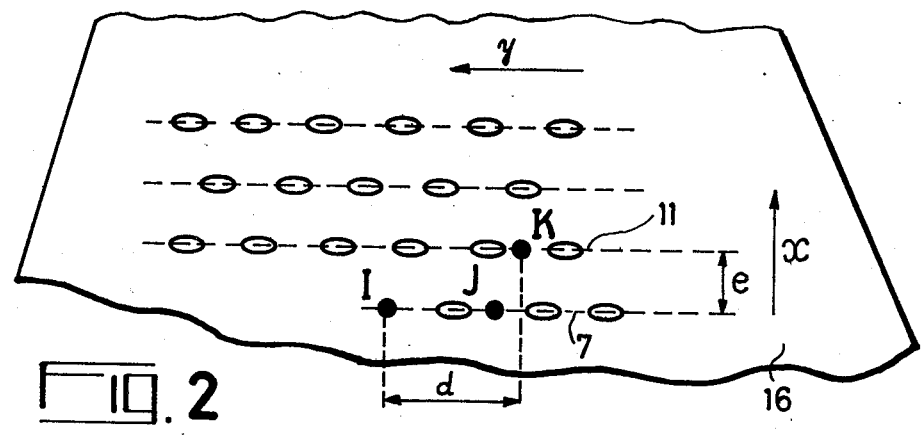
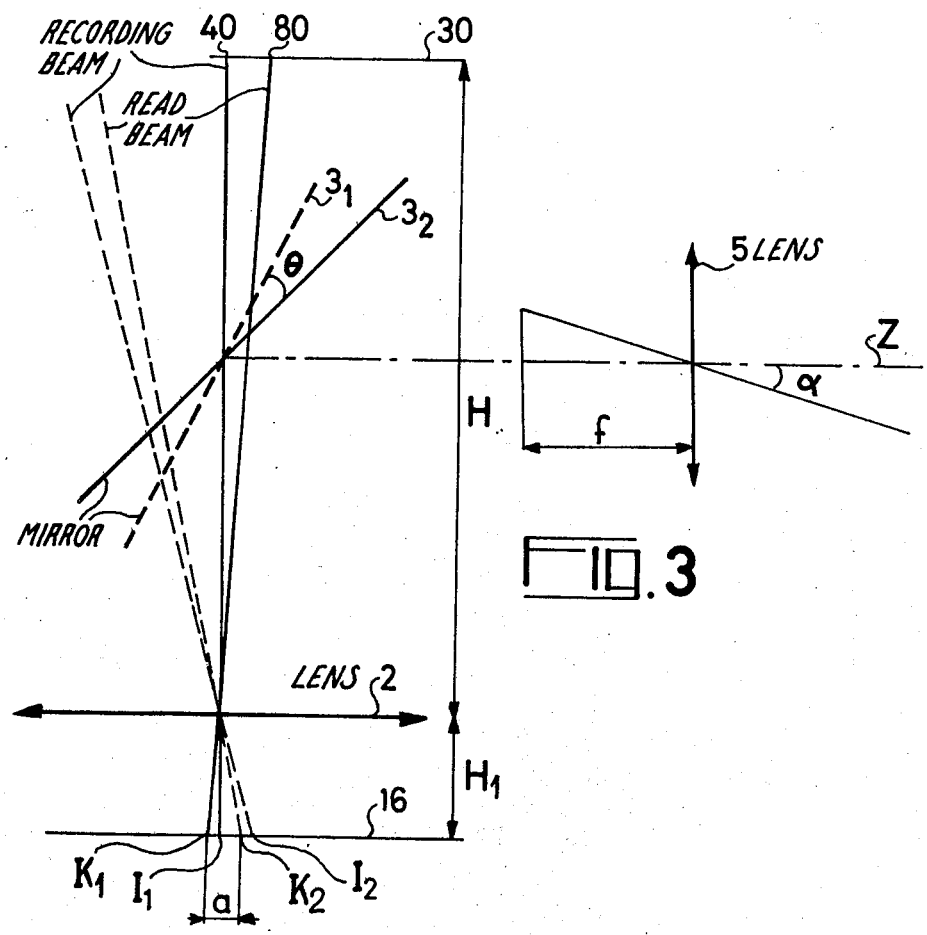

RECORDING DEVICE FOR OPTICALLY RECORDING INFORMATION ON A CARRIER WITH A LIGHT SPOT AND A POSITIONAL CONTROL OF THE SPOT

This is a continuation of application Ser. No. 837,383 filed Sept. 27, 1977, now abandoned.

FIELD OF THE INVENTION

This invention relates to an apparatus for optically recording information on a carrier surface along a track when the recording process immediately causes optically detectable changes of state in the carrier.

BACKGROUND OF THE INVENTION

The various components of an optical recording apparatus belong to the prior art. They comprise a recording head including means for emitting a modulated light beam which carries information and a lens enabling the beam to be focused into a recording spot on a precise point of the carrier surface.

The recording spot generates the track outlining under the control of an advancing mechanism with a screw driven by a motor. The carrier itself is supported by a rotating turn-table.

By a recording process, for example etching by ablation the information is recorded along a track which may be in the form of a spiral consisting of equidistant turns or in the form of an array of concentric and equidistant circles.

Such an apparatus necessitates an advancing screw machined with a high degree of precision, because the movement of the recording head has to be uniform and progressive to ensure the equidistance of the turns of the track. The rotational speed of the carrier has to be completely uniform as well.

The advancing mechanism has to show a high level of mechanical stability. In order to prevent two successive turns from overlapping one another or at least from being hardly distinguishable during reading, the radial positional error in relation to the ideal outlining has to be less than 0.1 $\mu$m for a track pitch of 1.6 $\mu$m. Similarly, the turn-table supporting the carrier has to ensure perfect rotation thereof.

BRIEF SUMMARY OF THE INVENTION

The apparatus according to the invention represents an improvement in the apparatus described above in regard to the advance of the recording spot on the carrier. It eliminates the need for the precision mechanical components by correcting all the imperfections caused by vibrations and inevitable tolerances.

In the apparatus according to the invention, the position of the recording spot on the desired ideal outlining is kept at a constant distance from a previously recorded turn by means of a radial feedback control, said beam being marked by a supplementary reading beam. The interval between successive turns is therefore constant, except for the residual error, despite the vibrations, tolerances and irregularities of the turns themselves.

In accordance with the present invention, there is provided a recording device for recording information onto a carrier surface having a rotation axis; said information being optically stored along a track made of successive turns of uniform pitch e, and in a form immediately readable after recording; said device comprising: means for rotating said surface, first means for projecting onto said surface a recording spot optically modulated by said information, second means for projecting onto said surface a reading spot separated from said recording spot by a radial spacing equal to n times the pitch e, n being an integer; said device further comprising: radial displacement means for radially displacing said spots in relation with said surface, and radial feedback control means responsive to the light emerging from the portion of said surface illuminated by said reading spot for the tracking by said reading spot of one of said turns while said recording spot is recording said information along another one of said turns.

SUMMARY OF THE DRAWINGS

For a better understanding of the present invention, and to show how the same may be carried into effect, reference will be made to the ensuing description with reference to the accompanying drawings among which:

FIG. 1 shows one embodiment of the invention.

FIG. 2 shows the result obtained on the surface of the carrier.

FIG. 3 is an explanatory diagram.

DETAILED DESCRIPTION OF THE PREFERRED EMBODIMENT

Figure 4:
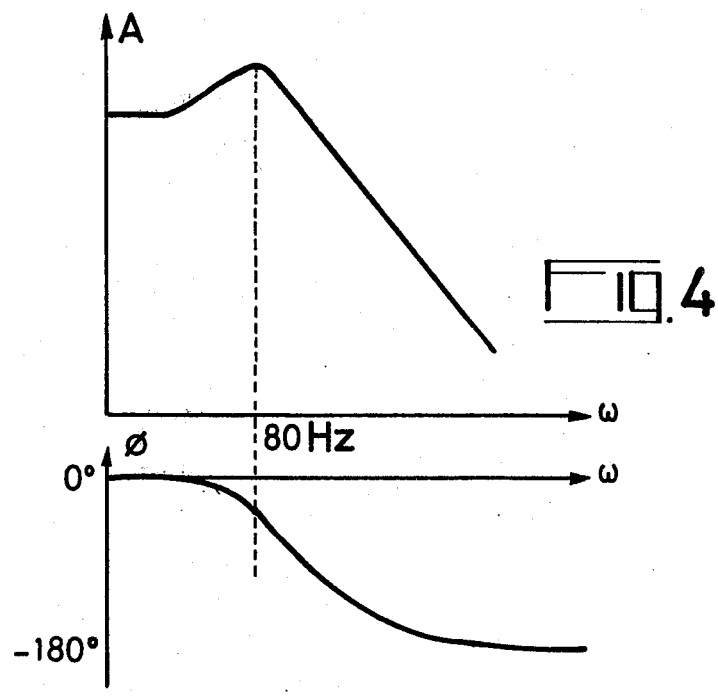
FIG. 4 shows a sketch of the amplitude and phase curves of a galvanometric mirror.

As in conventional apparatus, a flat carrier 1 receives by way of a mirror 3 and a lens 2 a light beam 4 made slightly divergent by means of a convergent lens 5. The beam 4 is supplied from a modulated light source 6. The surface 16 of the carrier 1 is situated in the plane conjugate with the plane of the object light source relative to the optical system consisting of the lens 5, the mirror 3 and the lens 2. Accordingly, the beam 4 focuses on the surface 16 at a point I of a turn under etching 7.

The beam 4 contains the information intended to be recorded on the surface 16 in the form of a continuous spiral track. This result is obtained on the one hand by the rotation of the carrier about an axis of rotation 22 by means of a motor 21 and, on the other hand, by means of another motor 20 which provides for a translatory movement in the direction x of a casing 29 fastening the elements 5, 3 and 2. Under the effect of this movement, the point I is displaced from the end of the carrier towards the center.

A control of the radial position of the point I is made by a system comprising a light source 12, for example in the form of a helium-neon laser, which emits a reading beam 8 having a wavelength different from that of the recording beam. After reflection at a semi-transparent plate 13, the reading beam 8 traverses the same optical system as the recording beam and focuses onto the surface 16 at a point K situated on an already etched turn 11. The position of the points I and K, which are in fact tiny spots, is shown in FIG. 2. The turns 11 and 7 are separated by the pitch of the track equal to e. This radial interval is fixed by the setting of the angle $\alpha$ formed by the axis Z of the beam 4 and the axis $Z_1$ of the beam 8 in the plane of FIG. 1.

The diameter of each of the spots I and K is about 1 $\mu$m. To ensure that the diffraction patterns of the two spots do not overlap, it is necessary to increase the distance between I and K by introducing a tangential interval d obtained by staggering the two beams at a fixed angle in a plane perpendicular to the plane of FIG. 1 and to the plane of the surface 16. The orientation of the reading beam is adjusted by pivoting the plate 13 which is moveable in all directions about the point M.

In the case of FIG. 1, reading is obtained by reflection. After having passed through the plate 13, the beam reflected by the surface 16 is received by a position sensor 15 optionally comprising an optical filter for eliminating any parasitic components originating from the recording beam of which the wavelength is different from that of the reading beam. The sensor 15 consists essentially of spatially staggered photoelectric cells which detect the position of the point K in relation to the track 11 by a process similar to that used in a reader. Other cells, so-called reading cells, may also be provided for reading the information etched into the track 11. The sensor 15 delivers an electrical signal, proportional to the detected position error, which controls the rotation of the mirror 3 about an axis 17 perpendicular to the plane of FIG. 1 by means of a motor 23.

By simple optical reasoning on the basis of FIG. 3, it can be seen that rotation of the mirror 3 through an angle $\theta$ from $3_1$ to $3_2$ makes the position of the point I change from $I_1$ to $I_2$ and the position of the point K change from $K_1$ to $K_2$. The distances $I_1 I_2$ and $K_1 K_2$ are equal to a same value: a.

It is readily possible to deduce from FIG. 3 the relation between the pitch e and the angle $\alpha$: tg $\alpha = eG/f$, f being the focal length of the lens 5 and G the magnification of the lens 2: $G = H/H_1$, where H is the distance of the lens from the plane 30 of the virtual sources 40 and 80 of the two beams 4 and 8, and $H_1$ is the distance between the lens and the surface 2.

The values of these parameters may be as follows:
f = 3 mm
G = 50
e = 1.6 $\mu$m
a < 1.6 $\mu$m, i.e. < $0.2 \cdot 10^{-3}$ rad.

Under these conditions, the variation in H due to the rotation of the mirror 3 is negligible by comparison with the value of H and the pitch e is dependent solely upon the angle $\alpha$. Where e is equal to 1.6 $\mu$m, the value of $\alpha$ is 3 m rad.

In order to make the variation of the pitch lower than about 0.1 $\mu$m, and hence the variation of the angle $\alpha$ lower than about 0.2 m rad, the stability range of the plate 13 must be within 0.1 m rad.

In conventional recording apparatus, the speed of the recording head in the direction x, known as the radial speed, is controlled by a screw driven by a motor. This speed is therefore constant provided that the screw is perfect. In the apparatus according to the invention, it is still possible to use a screw. In this case, it is necessary to have perfect equality between the value of the pitch defined by the translation speed ensured by the screw and the rotation speed of the support, and the value of the pitch defined by the angle $\alpha$, so as to ensure that the detected error is always comprised within such limits that it does not increase continuously.

Accordingly, it is preferable to match the pitch e, the rotational speed and the radial speed by using the mean value of the error signal for controlling the motor 20, the screw being optional. This mean value may be obtained by a low-pass filter or by an integrator or by any electronic system 19 which, at its output, supplies the mean value of a variable electrical signal applied to its input. The motor 20 drives the entire optical system common to the two beams. The spots I and K are simultaneously displaced without any variation in the interval e.

The apparatus may be improved by providing reading elements in the sensor 15. A synchronizing signal issued from the read signal makes it possible to control the speed of rotation by means of the motor 21, or to effect with a feedback loop the control of the position of the point K and hence of the point 1 in a direction tangential to the track. The reading elements may be distinct from the sensor 15 and may form a reading device 25 illuminated by a part of the reflected beam, deflected by a semi-transparent plate 24.

To operate correctly, the radial feedback loop, including the sensor 15, the motor 23 and the mirror 3, must be stable. The feedback in question here is of a particular type because the error signal which radially corrects the position of the point K takes into account the residual error of the preceding revolution. Experimentation has shown that, despite satisfying the Nyquist criterion, it is hardly possible to obtain stable operation under any condition.

Figure 6:
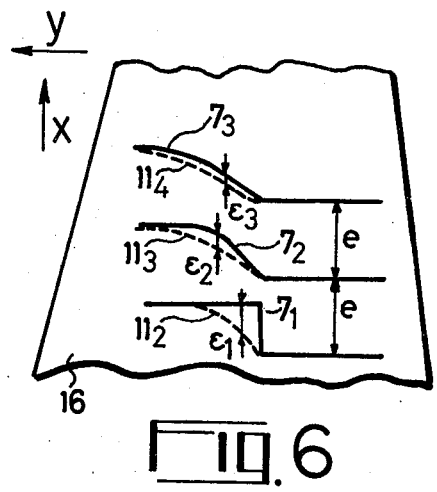
FIG. 6 and FIG. 7 are explanatory diagrams.
Figure 7:
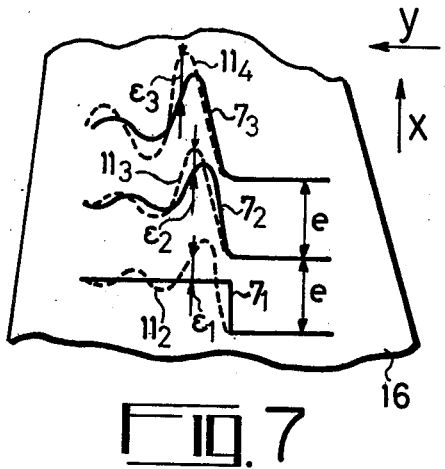

FIG. 6 and FIG. 7 explain the phenomenon with reference to one example. Each of these Figures shows a sudden deformation in the form of a step of an already etched turn $7_1$ and the path actually followed by the reading beam $11_2$. If the response of the feedback loop were ideal, this path would merge with the turn $7_1$. The contiguous turn $7_2$, at the distance e from the path $11_2$, is followed during reading along the path $11_3$ and so on.

In FIG. 6, according to one possible response of the loop, the path $11_2$ is separated from the turn $7_1$ by a distance representative of an error $\epsilon_1$. This error $\epsilon_1$ decreases and approaches 0 when the spots I and K are moving in the direction y. Similarly, the path $11_3$ is spaced from the turn $7_2$ by an error $\epsilon_2$. The sequence formed by the successive errors $\epsilon_1, \epsilon_2 \ldots$ moving in the direction x is decreasing and approaches 0.

In FIG. 7, a different response is considered, comprising an oscillatory transient so that the error $\epsilon_1$ is alternately positive and negative. If the Nyquist criterion is satisfied, the amplitude of the oscillations decreases and approaches 0.

During the following revolution, however, the error $\epsilon_2$ may be greater than $\epsilon_1$ and the sequence $\epsilon_1, \epsilon_2 \ldots$ may diverge. This leads to an instability which is of a different type from that of conventional feedback control systems.

This example demonstrates the need for a more stringent criterion than the Nyquist criterion. Experience justifies the following criterion: the real part of the complex gain of the loop should be greater than $-\frac{1}{2}$.

Figure 5:
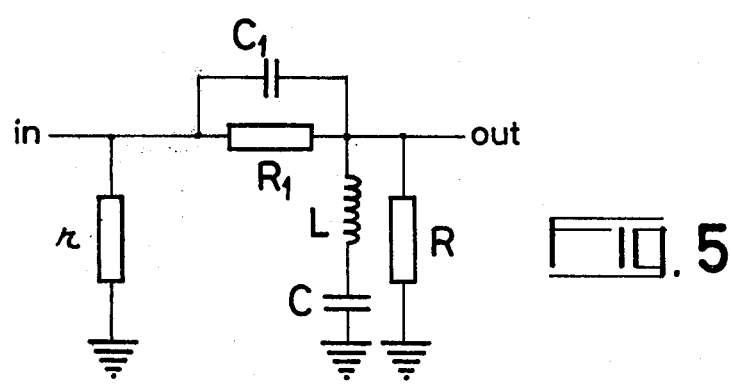
FIG. 5 is a block diagram of a correcting filter introduced in the feedback loop.

The mirror 3 is a galvanometric mirror of which the amplitude response curve A and phase response curve $\phi$ as a function of the frequency w have sketches shown in FIG. 4. In order to satisfy the stability criterion, a correcting filter of which the circuit diagram is shown in FIG. 5 is introduced between the sensor 15 and the motor 23. The filter, which is tuned to the resonance frequency of the mirror, acts as an attenuator, mainly at low frequencies, and has an infinite rejection at the resonance frequency of the mirror. As a guide, the values of the elements of which the symbols are shown in FIG. 5 may be as follows: R = 1 K$\Omega$; $R_1$ = 1 K$\Omega$; C = 10 $\mu$F; $C_1$ = 100 nF; L = 400 mH. For example, a differential amplifier included in the sensor 15, of zero output impedance, may be connected at the input of the filter.

Otherwise, a resistor r of low value (about 100Ω) could be connected in parallel with the input. The arrangement is such that the impedance loading the filter should be substantially larger than its internal impedance. For a mirror of which the response curve is that shown in FIG. 4, a loop gain of the order of 40 dB is thus obtained.

This type of filter by no means limits the invention in any way. It is also possible to use any type of compensating system which provides for stability and satisfies the criterion referred to.

The invention is not limited to the embodiment illustrated in FIG. 1. Thus, it is possible to use a recording process different from etching by ablation. Reading may be obtained by transmission. In that case, the sensor 15 is positioned in the path of the transmitted reading beam. The radial interval between the two spots I and K may be greater than e and may be multiple of e. However, this interval should not be too large so that the approximations made remain justified.

Figure 8:
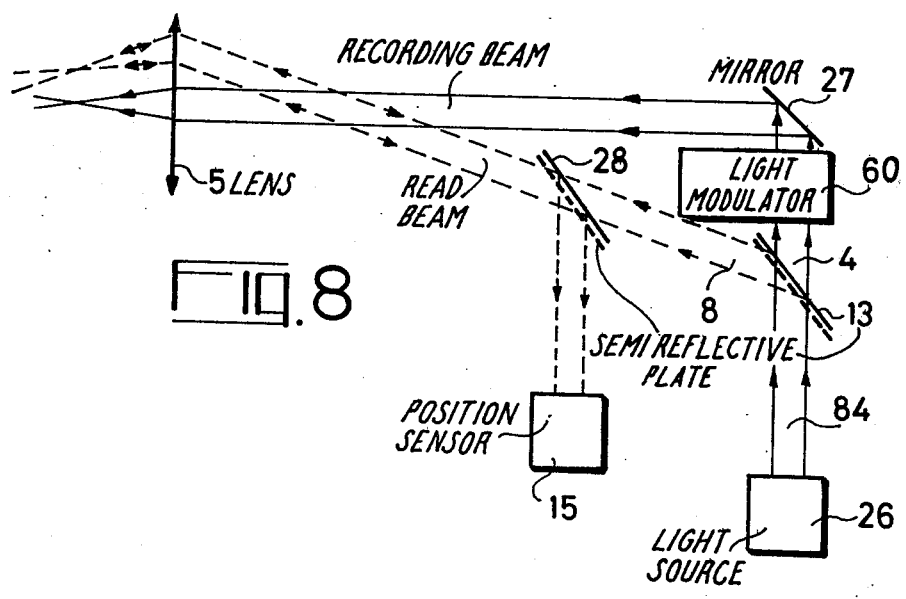
FIG. 8 shows a modified embodiment of the invention.

The beam 8 may be obtained in a different manner whether it is supplied from its own light source having a different wavelength from that of the recording beam, or whether it is supplied from the same source as the recording beam. One example of embodiment is shown in FIG. 8. A light source 26, for example an argon laser, supplies a light beam 84 which an orientable semi-transparent plate 13 divides into a reading beam 8 and a beam 4 intended to be modulated by a light modulator 60 and directed by a mirror 27 towards the lens 5. After reflection (or transmission) by the carrier, the reading beam is received by the sensor 15 after reflection at a plate 28. The sensor 15 comprises means enabling parasitic components originating from the recording beam to be eliminated, for example a low-pass filter eliminating the modulated component by any mechanical, optical or electronic means ensuring the separation of the two beams.

The invention is also applicable to the case where the track is formed by concentric circles. In that case, the advancing motor 20 is step by step controlled by a synchronizing signal issuing from the read signal which causes a jump of one turn per revolution.

The apparatus according to the invention affords all the possibilities of a conventional recorder. For example, it is possible to verify the quality of the recording immediately it has been made by using another reading beam of which the spot on the carrier is situated at J in FIG. 2. The position of the point J may optionally have its own feedback control, but it is not linked to that of the point I.

The apparatus according to the invention opens up new possibilities. The constituent elements of the apparatus enable the recorder to be used without modification as a reader. It is sufficient for this purpose to provide reading elements, as indicated above, either in the sensor 15 or separately.

It is possible to interrupt a recording programme and to resume it after an interval of any duration. The positioning of the recording spot solely takes into account a previously recorded turn and is not affected by any vibration and adjustments which may have occured during the interruption.

What we claim is:

1. A recording device for recording information onto a carrier surface having a rotational axis; said information being optically stored along a continuous spiral track of uniform pitch e, in a form immediately readable after recording; said device comprising:

means for rotating said surface, first means for projecting onto said surface a recording spot optically modulated by said information, and second means for projecting onto said surface a reading spot producing a continuous illumination and separated from said recording spot by a radial spacing equal to n times the pitch e, n being the integer different from 0, said first and second means having in common a projection lens and a pivoting mirror for; said lens and said mirror being radially displaced from said radial displacement means;

said device further comprising radial displacement means for radially displacing said spots in relation with said surface; and radial feedback control means including a feedback loop having a network enabling the real part of the complex loop gain to be greater than $\frac{1}{2}$, responsive to the light emerging from the portion of said surface illuminated by said reading spot;

said light being modulated by information previously recorded by said recording spot, said radial feedback means providing a first electrical signal for the tracking by said reading spot of one of said turns while said recording spot is recording said information along one of said turns, said radial feedback control means further providing a second electrical signal controlling said displacement means and including a sensor delivering an electrical error signal representative of the tracking error of said reading spot in relation to said one of said turns;

said electric error signal producing a rotation of said mirror in order to reduce said tracking error;

said feedback loop having a notch at a frequency equal to the resonance frequency of said pivoting mirror.

2. A recording device for recording information onto a carrier surface having a rotation axis; said information being optically stored along a continuous spiral track of uniform pitch e, in a form immediately readable after recording; said device comprising: means for rotating said surface, first means for projecting onto said surface a recording spot optically modulated by said information, second means for projecting onto said surface an unmodulated reading spot producing a continuous illumination and separated from said recording spot by a radial spacing equal to n times the pitch e, n being an integer different from zero; said device further comprising: radial displacement means for radially displacing said spots in relation with said surface, and radial feedback control means responsive to the light emerging from the portion of said surface illuminated by said reading spot, said light being modulated by information previously recorded by said recording spot, said radial feedback control means providing a first electrical signal for the tracking by said reading spot of one of said turns while said recording spot is recording said information along another one of said turns, said radial feedback control means further providing a second electric signal controlling said displacement means.

3. A recording device as claimed in claim 2, wherein said first and second means have in common a projection lens and a pivoting mirror; said lens and said mirror being radially displaced by said radial displacement means.

4. A recording device as claimed in claim 3, wherein said radial feedback control means comprise a sensor delivering an electric error signal representative of the tracking error of said reading spot in relation with said turns; said electric error signal producing a rotation of said mirror, in order to reduce said tracking error.

5. A recording device as claimed in claim 4, wherein said radial feedback control means comprise a feedback loop of which the gain is negative and has an absolute value less than ½.

6. A recording device for recording information onto a carrier surface having a rotational axis; said information being optically stored along a continuous spiral track of uniform pitch e, in a form immediately readable after recording; said device comprising:

means for rotating said surface, first means for projecting onto said surface a recording spot optically modulated by said information, and second means for projecting onto said surface an unmodulated reading spot producing a continuous illumination and separated from said recording spot by a radial spacing equal to n times the pitch e, n being an integer different from 0, said first and second means having in common a projection lens and a pivoting mirror for projecting said recording spot and said reading spot onto said surface; said lens and said mirror being radially displaced from said radial displacement means;

said device further comprising: radial displacement means for radially displacing said spots in relation with said surface; and radial feedback control means including a feedback loop having a network enabling the real part of the complex loop gain to be greater than ½, responsive to the light emerging from the portion of said surface illuminated by said reading spot;

said light being modulated by information previously recorded by said recording spot, said radial feedback means providing a first electrical signal for the tracking by said reading spot of one of said turns while said recording spot is recording said information along one of said turns, said radial feedback control means further providing a second electrical signal controlling said displacement means and including a sensor delivering an electrical error signal representative of the tracking error of said reading spot in relation to said one of said turns; said electric error signal producing a rotation of said mirror, in order to reduce said tracking error.

7. A recording device as in claim 2 or claim 6 further comprising photocell means responsive to said light emerging from the portion of said surface illuminated by said reading spot, for reading said information from said carrier surface.

8. A recording device as claimed in claim 2 or claim 6, wherein the second electric signal provided by said radial feedback control means is the mean value of said electric error signal.

9. A recording device as claimed in claim 2 or claim 6, wherein said first and second means have in common a light source supplying a light beam and a semi-reflective plate disposed on the path of said light beam in order to form a recording beam and a reading beam; said first means further comprising a light modulator disposed on the path of said recording beam for modulating the light of said recording beam by said information.

10. A recording device as claimed in claim 1 or claim 6, wherein said first means comprise a first light source modulated by said information and said second means comprise a second light source.

11. A recording device as claimed in claim 10, wherein the wavelength of said first and second light sources are different.

12. A recording device as claimed in claim 2 or claim 6, wherein said radial feedback control means comprise reading means delivering a synchronizing electric signal for controlling said means for rotating said carrier surface.

13. A recording device as claimed in claim 2 or claim 6, wherein said carrier surface is coated with a thin layer; said layer being selectively etched away by said recording spot in accordance with said information.

* * * * *